United States Patent
Polak et al.

(10) Patent No.: US 12,193,468 B2
(45) Date of Patent: Jan. 14, 2025

(54) PASTA WITH A LOW GLYCEAMIC INDEX

(71) Applicant: WYTWÓRNIA MAKARONU DOMOWEGO POL-MAK S.A., Ludwin (PL)

(72) Inventors: Dominik Polak, Ludwin (PL); Aldona Sobota, Lublin (PL)

(73) Assignee: WYTWÓRNIA MAKARONU DOMOWEGO POL-MAK S.A., Ludwin (PL)

( * ) Notice: Subject to any disclaimer, the term of this patent is extended or adjusted under 35 U.S.C. 154(b) by 281 days.

(21) Appl. No.: 17/622,092

(22) PCT Filed: Jul. 13, 2020

(86) PCT No.: PCT/IB2020/056564
§ 371 (c)(1),
(2) Date: Dec. 22, 2021

(87) PCT Pub. No.: WO2021/009657
PCT Pub. Date: Jan. 21, 2021

(65) Prior Publication Data
US 2022/0361535 A1    Nov. 17, 2022

(30) Foreign Application Priority Data
Jul. 18, 2019 (PL) .......................... 430645

(51) Int. Cl.
*A23L 7/109* (2016.01)
*A23L 33/21* (2016.01)

(52) U.S. Cl.
CPC .............. *A23L 7/109* (2016.08); *A23L 33/21* (2016.08)

(58) Field of Classification Search
CPC ................................. A23L 7/109; A23L 33/21
See application file for complete search history.

(56) References Cited

U.S. PATENT DOCUMENTS

| | | | |
|---|---|---|---|
| 2007/0031564 A1 | 2/2007 | Fontanesi et al. | |
| 2015/0004300 A1* | 1/2015 | Cavalieri Manasse | ...................... A21D 13/047 426/549 |

FOREIGN PATENT DOCUMENTS

| | | |
|---|---|---|
| CN | 106858317 A | 6/2017 |
| EP | 0997078 A2 | 5/2000 |
| EP | 2241193 A1 | 10/2010 |
| EP | 2796057 A1 | 10/2014 |
| IT | RM20110122 A1 | 9/2012 |
| RU | 2446708 C1 | 4/2012 |

OTHER PUBLICATIONS

Kaur et al. J Food Sci Tech, Jul.-Aug. 2012, 49 (4), 46-474. (Year: 2012).*
Steglich, "Pasta as an example for structure and dynamics of carbohydrate rich foods". SIK Report 849, pp. 1-77. (Year: 2013).*
Chillo, S. et al. "Influence of the addition of buckwheat flour and durum wheat bran on spaghetti quality" Journal of Cereal Science, Academic Press Ltd., GB, vol. 47, No. 2 (2008), pp. 144-152.
Database Compendex [Online] Engineering Information, Inc. (2012) Jayasena, Vijay and Syed M. Nasar-Abbas. "Development and Quality Evaluation of High-Protein and High-Dietary-Fiber Pasta Using Lupin Flour." Journal of Texture Studies 43 (2012): 153-163.
Martinez-Villaluenga, C. et al. "Semolina supplementation with processed lupin and pigeon pea flours improve protein quality of pasta" (2010) LWT—Food Science and Technology, vol. 43, Issue 4, pp. 617-622.
International Search Report and Written Opinion issued for PCT/IB2020/056564, dated 2020-11-06.

* cited by examiner

*Primary Examiner* — Jenna A Watts
(74) *Attorney, Agent, or Firm* — Andrzej Malarz, Esq.

(57) ABSTRACT

The invention relates to a pasta that is characterised by that it contains, as gluten flour, durum-wheat semolina or a mixture of durum-wheat semolina with common wheat flour in quantities of 20-70% by weight, whereby common wheat flour is present in quantity of maximum 50% by weight in relation to the mixture, moreover, it contains 5-50% by weight of lupin flor, 5-30% by weight of fiber, and 3-10% by weight of vital gluten, and an addition of water. In an alternative solution the pasta contains additionally 5-30% of millet flour. The invention allows to acquire pasta with Gl less than 40% and with glycaemic load of less than 10%. The pasta, as far as its sensory characteristics (bright colour, high organoleptic and culinary quality) are concerned, is similar to a traditional wheat pasta which has Gl approximately 50-60% and GL about 20%.

3 Claims, No Drawings

PASTA WITH A LOW GLYCEAMIC INDEX

CROSS-REFERENCE TO RELATED APPLICATION

This Application is a Section 371 National Stage Application of International Application No. PCT/IB2020/056564, filed Jul. 13, 2020 and published as WO 2021/009657 A1 on Jan. 21, 2021, in English, which claims priority to PL patent application Serial No. P.430645, filed Jul. 18, 2019, the contents of which are hereby incorporated by reference in their entirety.

The present invention relates to a pasta having a low glyceamic index and glyceamic load.

Glyceamic index (GI) is a parameter which makes possible to classify food products according to their impact on postprandial blood glucose levels. It determines in percentage terms the speed of blood glucose level increase after eating a product which contains specific amount of carbohydrates in comparison to the increase which takes place after eating the same amount of carbohydrates in the form of pure glucose.

Products having high glyceamic index are quickly digested and absorbed in the gastrointestinal tract. Postprandial blood glucose level rises steeply, insulin is intensely released and then blood glucose level decreases fast which causes an increase of glucagon release and an increase in food craving.

Glyceamic load gives overview of not only digestion dynamics and of absorption of carbohydrates into the blood but also takes into account their amount in a portion eaten. The higher the value of glyceamic load, the bigger the increase of glucose blood level and the stronger insulin response towards a portion of a particular product. A similar glyceamic load, that is glyceamic index pertaining to a portion of a particular food product, usually gives a similar glyceamic response.

The diet of people having carbohydrate metabolism disorders and of people fighting overweight and obesity it is advantageous to adopt meals containing products with a low glyceamic index and, at the same time, a low glyceamic load (low content of carbohydrates absorbed in one portion). Their consumption causes slow increase and relatively low and stable blood glucose level which corresponds to a low postprandial insulinemia.

In recent years, due to bad eating habits, conditions such as obesity, insulin resistance or diabetes have started to arise more and more frequently. According to the World Health Organization (WHO) in 1980 the number of diabetic adults was 108M, in 2014 it was already 422M. Almost four-fold increase over several decades is a wake-up call to implement intensive preventive measures. It is estimated that in 2040 the number of diabetic people will increase to 642M. Diabetes type 2 constitutes 90-95% of all diabetic cases.

It is assumed that environmental factors, especially diet, play a big role in the increase of diabetes type 2 cases. Dietary recommendations indicate that complex carbohydrates with a low glyceamic index (<50) should be the main source of calories in diet. They should provide 40-50% of caloric value of a daily food ration (circa 1000 kcal). Moreover, products with GL<10 are recommended.

In order to meet dietary recommendations and taking into account growing consumer awareness about preventing and reducing or removing symptoms relating to carbohydrate metabolism disorders by using products with a low glyceamic index it is desired that there are wide choice of these products on the market. Using postprandial glyceamic index for the proper dietary preparation allows to regulate and to control blood sugar level and is beneficial for the human body.

From the description of patent CN106858317 (A) there is known a pasta with a low glyceamic index. Its ingredients are wheat flour, buckwheat flour, Tartary buckwheat flour, soybean flour, mung beans flour, seaweed flour, konjac flour, dietary fiber and an improver.

Patent RU2446708 relates to pasta products made from water, gluten-free flour (rice, corn, buckwheat) and an additional ingredient which can be starch, pea, millet, soya, lupine, amaranth flours, fruit and vegetable powders.

The description of patent US2007031564 discloses a pasta containing gluten-free starch source (corn, potatoes), gluten-free flour (pea, bean, horse bean, soya, carob, lentil, peanut, lupine, and/or their mixture), gluten-free protein source from peas, beans, horse beans, soya, carob, lentils, peanuts, lupine, concentrate or its isolates and/or their mixture), emulsifier (soy lecithin, sunflower lecithin, esters of fatty acids mono- and diglycerides, fatty acid mono- and diglycerides and/or their mixture).

Invention EP0997078 is known relating to a pasta based on semolina enriched with vegetable proteins containing at least one protein concentrate and/or isolate of a legume, preferably lupin.

The problem to be solved in this invention is to obtain pasta with a low glycaemic index and glycaemic load which contains a mixture of gluten flour and gluten-free flour, whereby gluten-free flour is lupin flour and millet flour, whereas as gluten flour is to be understood durum-wheat-semolina or a mixture of durum-wheat semolina with common wheat flour for pasta, and contains moreover an addition of fiber, vital gluten and an addition of water.

Low glycaemic index pasta according to the invention based on gluten flour with an addition of dietary fiber is characterised in that it contains 20-70% by weight of durum-wheat semolina or a mixture of durum-wheat semolina with common wheat flour in the same quantity, whereby common wheat flour constitutes maximum 50% by weight of said gluten flour mixture, preferably 5-30% by weight, moreover, the pasta contains 5-50% of lupin flour, 5-30% fiber and 3-10% of vital gluten and an addition of water.

Preferably, the quantity of lupin flour is 15-40% by weight, and preferably oats and barley are the source of fiber.

In an alternative solution, the pasta, apart from the above mentioned ingredients, contains an addition of millet flour from 5 to 30% by weight of the ingredients.

The invention relating to ingredients of the pasta is presented in the following examples:

EXAMPLE 1

Pasta Containing:
  Durum-wheat semolina—67.5%
  Lupin flour—20%
  Oat fiber—7.5%
  Vital gluten—5%

EXAMPLE 2

Pasta Containing:
  Durum-wheat semolina—35%
  Lupin flour—20%
  Oat fiber—20%
  Vital gluten—5%
  Millet flour—20%

EXAMPLE 3

Pasta Containing:
  Durum-wheat semolina—40%
  Lupin flour—30%
  Oat fiber—10%
  Vital gluten—10%
  Millet flour—10%

EXAMPLE 4

Pasta Containing:
  Durum wheat-semolina—63%
  Lupin flour—15%
  Oat fiber—15%
  Vital gluten—7%

EXAMPLE 5

Pasta Containing:
  Durum-wheat semolina—61%
  Lupin flour—25%
  Oat fiber—10%
  Vital gluten—4%

EXAMPLE 6

Pasta Containing:
  Durum-wheat semolina—35%
  Lupin flour—15%
  Oat fiber—15%
  Vital gluten—5%
  Millet flour—30%

EXAMPLE 7

Pasta Containing:
  Durum-wheat semolina—20%
  Common wheat flour for pasta—20%
  Lupin flour—30%
  Oat fiber—10%
  Vital gluten—10%
  Millet flour—10%

EXAMPLE 8

Pasta Containing:
  Durum-wheat semolina—30%
  Common wheat flour for pasta—10%
  Lupin flour—25%
  Oat fiber—15%
  Vital gluten—10%
  Millet flour—10%

The pasta according to the invention is obtained by the following method: first, a mixture of loose ingredients in proper proportions is prepared so that lupin flour, oat fiber and vital wheat gluten are added to durum-wheat semolina or to a mixture of durum-wheat semolina with common wheat flour. Alternatively, millet flour is added to a mixture of the ingredients described above. Water is gradually added to the loose components in quantities allowing to obtain dough with a moisture content of 25 to 35%. The dough is being mixed for 5-30 minutes in atmospheric pressure and/or 0.5-30 minutes in subatmospheric pressure of 0.06-0.1 MPa. Thus prepared dough is formed into thick-walled types of pasta (fusilli, spaghetti, penne or other) by being pushed through apertures in a die of a pasta presser. The pushing is performed under the pressure of 6 to 16 MPa. Thus formed pasta is left to dry in order to obtain a product containing 13% of water by weight.

As a result of such process in accordance to the invention pasta with following parameters is obtained: water content up to 13% by weight, protein content from 15 to 30% by weight, fat content from 2 to 5% by weight, mineral content from 1 to 2% by weight, dietary fiber total from 15 to 30% including from 7 to 15% by weight of soluble fiber, available carbohydrates content less than 50% by weight. Glycaemic index as determined in vivo is less than 40%, whereas glycaemic load is less than 10%.

The invention makes it possible to acquire pasta with GI less than 40% and with glycaemic load less than 10%. The pasta, as far as its sensory characteristics (bright colour, high organoleptic and culinary quality) are concerned, is similar to a traditional wheat pasta which has GI approximately 50-60% and GL about 20%. The advantages of the pasta according to the invention are considerably lower GI and GL confirmed by in vivo tests, that its glycaemic index determined in vivo for the invention, particularly as described in examples 1 and 2, is from 33 to 38%, whereas glycaemic load is from 7 to 9.5%.

The advantage of the invention is the addition of lupin flour (5-50% by weight) which increases protein and fiber content in the product and supplements deficits of essential amino acids. Also, the addition of millet flour supplies carbohydrates and vitamins, especially B vitamins, and, moreover, contains protein and unsaturated fatty acids which support processes of losing weight. Another advantage consists in introduction of oat or barley fiber which contains water-soluble β-glucans which show multidimensional, beneficial effects for the human body. Apart from hypoglycaemic effects, they reduce blood cholesterol level, stimulate growth of desired bacterial flora and reduce processes of carcinogenesis in the large intestine. When used in products, they improve their health-promoting potential. The addition of vital gluten improves sensory characteristic of the pasta, determines the proper consistence of cooked pasta and improves its resistance for overcooking.

Pasta with a low glycaemic index is particularly useful for people with diabetes or suffering from obesity.

The pasta with ingredients according to the invention shows glycaemic index determined in vivo below 40%, whereas glycaemic load is below 10%. It is possible mostly due to the use of durum-wheat semolina and lupin flour and also due to the use, in alternative version of the invention, of additional millet flour. Moreover, the additional ingredients like fiber and gluten in specific quantities also determine that the index is low.

The invention claimed is:

1. A pasta with a low glycaemic index based on gluten flour comprising durum-wheat semolina with an addition of lupin and dietary fiber, characterised in that the pasta contains 5-50% by weight of lupin flour, 5-30% by weight of oat fiber or barley fiber, durum-wheat semolina or a mixture of durum-wheat semolina with common wheat flour in quantity of 20-70% by weight, whereby common wheat flour constitutes 5-30% by weight of the mixture, and 3-10% of vital gluten and the pasta contains glycaemic index less than 40% and a glycaemic load less than 10%.

2. The pasta according to claim 1 characterised in that lupin flour is present in quantity of 15-40% by weight.

3. The pasta according to claim 1, characterised in that it contains 5-30% by weight of millet flour.

* * * * *